(12) United States Patent
Sunol

(10) Patent No.: US 6,426,116 B1
(45) Date of Patent: Jul. 30, 2002

(54) SUPERCRITICAL FLUID AIDED COATING OF PARTICULATE MATERIAL

(75) Inventor: Aydin K. Sunol, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 09/529,568

(22) PCT Filed: Oct. 15, 1998

(86) PCT No.: PCT/US98/21751

§ 371 (c)(1),
(2), (4) Date: Oct. 26, 2000

(87) PCT Pub. No.: WO99/19085

PCT Pub. Date: Apr. 22, 1999

Related U.S. Application Data

(60) Provisional application No. 60/062,332, filed on Oct. 15, 1997.

(51) Int. Cl.$^7$ .................................................. B05D 7/00
(52) U.S. Cl. ...................... 427/217; 427/212; 427/215; 427/213; 427/216
(58) Field of Search ................. 427/212, 213, 427/213.3, 213.31, 213.32, 213.34, 213.36, 214, 215, 220, 221, 2.1, 211

(56) References Cited

U.S. PATENT DOCUMENTS

| | | | |
|---|---|---|---|
| 4,092,187 A | | 5/1978 | Hildebrant et al. ............ 149/11 |
| 4,678,684 A | * | 7/1987 | Sand ....................... 427/213.36 |
| 4,689,250 A | | 8/1987 | Quella et al. ................. 427/216 |
| 4,859,493 A | | 8/1989 | Lemelson .................... 427/562 |
| 5,399,597 A | | 3/1995 | Mandel et al. ............... 523/342 |
| 5,472,712 A | | 12/1995 | Oshlack et al. .............. 424/480 |
| 5,620,751 A | | 4/1997 | Brindoepke et al. ......... 427/506 |
| 5,766,637 A | * | 6/1998 | Shine et al. ................. 424/497 |
| 5,833,891 A | * | 11/1998 | Subramaniam et al. ........ 264/7 |

* cited by examiner

Primary Examiner—Shrive P. Beck
Assistant Examiner—Rebecca A. Blanton
(74) Attorney, Agent, or Firm—Kohn & Associates

(57) ABSTRACT

A method for preparing coatings of thin films onto solid particle has been achieved by in-situ simultaneous nucleation and deposition of dissolved material out of supercritical fluid, resultant film formation on the solid particles suspended in the supercritical fluid, and subsequent thermal conditioning of the coating in the particles. The coating method involves an enclosed system that provides: 1) for suspension of the solid particles to be coated; 2) for dissolution of the coating material in the supercritical fluid solvent; 3) for temperature or pressure swing operations causing film deposition/coating of the suspended solid particles and; 4) additional chemical addition and/or thermal cycles providing for any additional reactions required (such as polymerization).

18 Claims, 1 Drawing Sheet

SUPERCRITICAL FLUID AIDED COATING OF PARTICULATE MATERIAL

CROSS SECTION TO RELATED APPLICATIONS

This application is a National Phase of PCT Application No. PCT/US98/21751, filed Oct. 15, 1998, which is a conversion of U.S. Provisional Application Ser. No. 60/062,332, filed Oct. 15, 1997, all of which is incorporated herein by reference.

BACKGROUND OF THE INVENTION

1. Field of the Invention

The present invention relates to the uniform coating or encapsulation of energetic materials that are suitable for controlled release particulate applications, including air bags, gas generators, solid propellants, ordnance and time release drugs. In another aspect, the invention relates to a green technology.

2. Description of Related Art

The development of advanced, coated, particulate materials with tailored characteristics of release onset and rate control has direct application to air bags, gas generators, solid propellants, ordnance and time release drugs. These goals have been a long-lasting challenge to the propellant, ordnance and pharmaceutical industries. Until the advent and development of supercritical-fluid-aided material processing, the effort to identify successful techniques for achieving the required microns-thin, high-quality particle coatings was unsuccessful.

In the last ten years or so, there has been an influx of new supercritical-fluid-aided material processing options for a variety of materials. These processing applications include impregnation of porous matrices, formation of controlled porosity materials, coating/spraying of two-dimensional flat surfaces, macro-encapsulation, extrusion, nucleation of particles with narrow and controlled particle size, and drying.

Micro-encapsulation using supercritical fluids (SCF) has been tried by Tom et al. [1993] for drug-polymer systems with very limited success due to poor understanding of complex phenomena involved in co-nucleation of chemically diverse components. The RESS (Rapid Expansion of Supercritical Fluid Solutions) process used in these trials (first introduced by Krukonis [1984]) for micro-encapsulation has major limitations. Not only do particles with desired particle size and shape have to be nucleated, but also a uniform encapsulating material has to be formed simultaneously. The alternatives to SCF micro-encapsulation processes are spray chilling, standard fluidized bed coating, centrifugal extrusion, coacervation, and co-crystallization. These alternative processes often require the use of surfactants and thermally sensitive compounds that should be avoided because of their potential for contamination and disruption of the desired thin films.

There are many techniques, including SCF nucleation, which result in formation of particles with desired shape and particle size distribution. However, there are no processes other than SCF techniques that permit coating of particles with high quality of thin films. This invention permits coating and micro-encapsulation of particles in an environment fluidized by a supercritical fluid.

SUMMARY OF THE INVENTION

In accordance with the present invention, there is provided a method for forming thin films on particles, the method including the steps of suspending particles to be coated in a supercritical fluid containing dissolved coating material therein and then simultaneously nucleating and depositing the dissolved coating material onto the surface of the particles forming the desired thin films.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
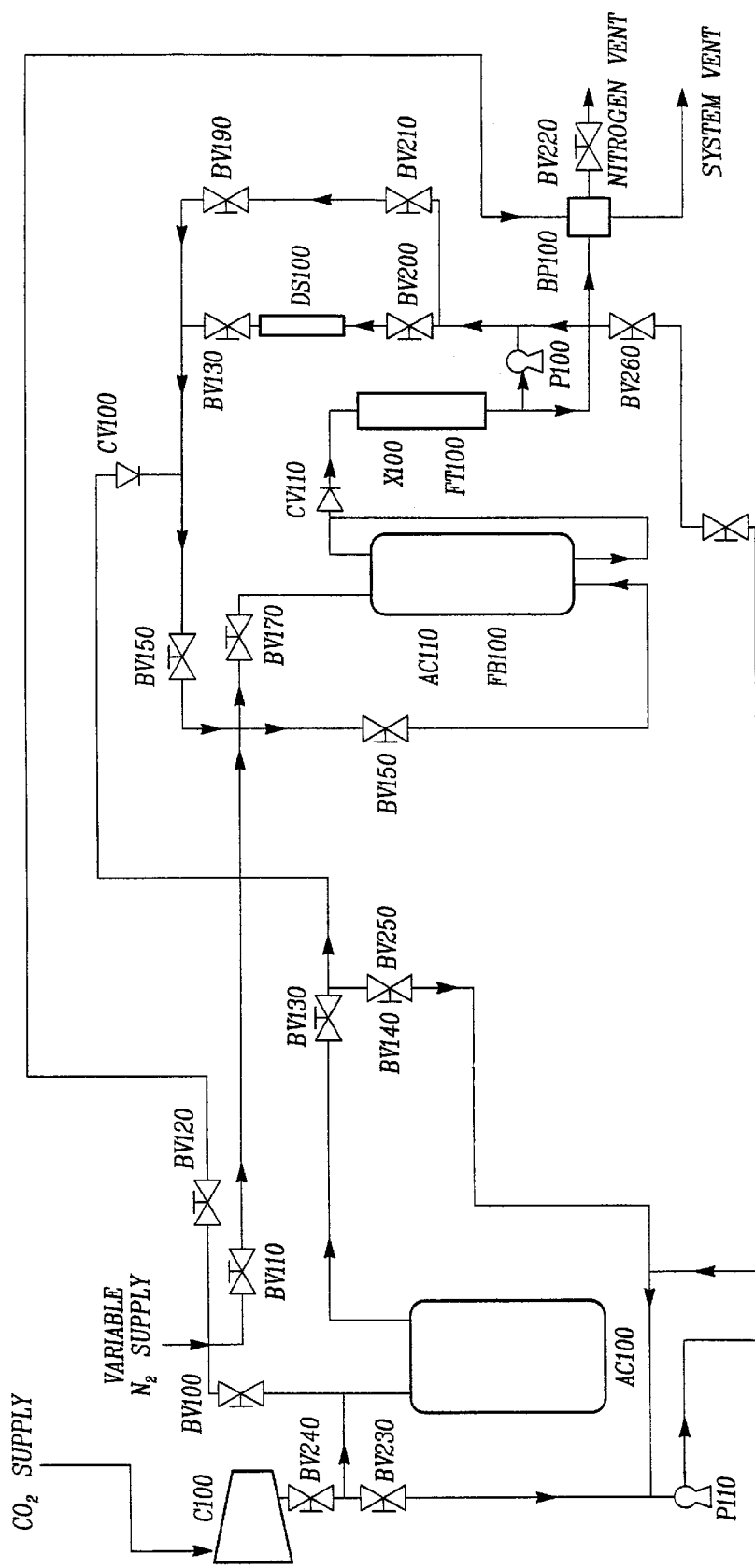
FIG. 1 is a schematic description of the process prototype.

Generally, the present invention provides a method for forming thin films on particles. Most generally, the method includes the steps of suspending particles to be coated in a supercritical fluid containing dissolved coating material therein. This is followed by a simultaneous nucleation and disposition of the coating material onto the surface of the particles, thereby forming the desired thin film on the particles.

The particles coated can be various particles selected from the group, but not limited to ammonium nitrate, ammonium percholate, ammonium dinitramide, and other like oxidizers or high energy fuel solid particles such as carbohydrazide, metal azides, polymers highly substituted with strong reducing groups such as amides or azides, low molecular weight organic fuels such as phloroglucinol, or the like. Alternatively, the particle can be from the class of homogeneous propellants such as CL-20, HMX, RDX, TNAZ, or the like, these propellants being well known in the art.

The particles can be solid or porous. Examples of porous particles are hydrogels and aerogels. Such porous particles are coated and impregnated with the coating material. Uses for such coated particles are for use as microspheres in cell cultures.

The coating material of the present invention can be selected from polymers or prepolymer precursor coatings including thermoset polymers. Examples of such are polystyrene, polyolefin, polyepoxide, polyester, polyurethane, cellulosic, polyacrylate, a condensation polymer, or any similar compounds including halogen or other substituted forms. More specifically, a monomer coating can be used from, for example, styrene, acrylic, vinyl, or similar compounds, including halogen or other substituted forms.

The supercritical solvent of the present invention can be selected from the group including carbon dioxide, water, nitrous oxide, propane, or the like. Mixtures of these compounds can also be used as well as mixtures of supercritical and non-supercritical solvents.

The particles of the present invention can have a size range of between 10 and 1200 microns. The coating can range from 0.01 micron to 100 microns.

The various steps of the present invention can be initiated by various means. For example, the deposition and eventual film formation steps, as well as the various reaction steps can be initiated by changing the fluidized bed temperature. The temperature can be raised or lowered depending on the chemical conditions, these conditions being well known in the art. Alternatively, these steps can be initiated by exposing the fluidized bed to ultraviolet light or any high energy radiation, again, these conditions being well known in the art for various chemical reactions.

Various additives can be utilized in the fluidizing bath. For example, the additives can be any curative such as primary amines or diisocyanates, any plasticizer such as dioctyl phthalate, and catalysts such as dibutyl tin dilaurate or secondary/tertiary amines or free radical donors such as ferric acytyl acetonate or peroxides, or the like. The additives can be soluble in the bath fluid or sprayed thereover. The additives can be dissolved in the bath water through a cocurrent or countercurrent stream.

The specific interest of this invention is the coating of thin and uniform films on all surfaces of particles. It is possible that coatings, using the techniques described herein, composed of materials other than polymers (e.g., metals, cermets, ceramics, inorganic salts, elements, etc.) are possible and even desirable. However, for purposes of description, the following examples of coating materials will be limited to the organic polymer systems most useful in the near-term.

More specifically, the method can be broken down to three steps: The firs step is for formation of a solution of polymer or monomer together with additives as required such as initiators, curatives, catalysts, diluents, inhibitors, etc., all in a SCF solvent. The second step is the introduction and suspension of the particles to be coated in the flowing SCF/dissolved polymer stream. The third step is the simultaneous deposition on the particles of the polymers and/or monomers (as well as additives) for formation of thin films, with further polymerization (if required). The fluidization and deposition steps are continued by recirculation the SCF solution for a period of time, determined by both the polymerization and deposition rates, until encapsulation of particles with a coating or coatings with desired characteristics is achieved.

More specifically, the first vessel (AC100) is used to store the compressed or pumped fluid under supercritical or near critical conditions. The bed of particles (FB100) to be coated is placed in the second vessel (AC100, the fluidized bed). The internals of this second vessel permit passage of the SCF and solvated materials, but prevent entrainment of the fluidized particles beyond the vessel. Furthermore, dead space as well as by-pass, are avoided. The vessel contains an entrance device for uniform distribution of the SCF flow prior to the fluidized bed and a temperature sensor. Furthermore, it can be heated in a controlled fashion.

Initially, the particles are fluidized with SCF that is recirculated through a recirculation pump (P100) in a closed loop passing continuously through the fluidized bed. The loop is maintained at a low but still supercritical temperature (cooler DS100) while the fluidized bed is controlled with a heater at a higher temperature.

Upon achieving successful fluidization, the liquid feed that contains either a monomer or pre-polymer, along with any co-solubilized catalyst and curative, is introduced into the recirculation loop that is operating at a temperature that maximizes solubility of the system (i.e. a low but supercritical temperature). Increasing the fluidized bed temperature (while maintaining the recirculating loop temperature) causes either the coating reactants to begin to polymerize increasing their molecular weight causing precipitation, or, decreased solubility (reverse solubility) causing precipitation, or both. Data indicate that this can be accomplished in such a way as to maintain the desired component ratios to obtain the highest performance encapsulating films.

Alternative to monomers and pre-polymers, fully-formed resins such as nylon or styrene can be solubilized in the supercritical fluid and used to coat the particles using the same basic technique. The solubilized encapsulation components are introduced into the fluidized bed with process variables (pressure and temperature) maintained to assure their highest solubilized state. Changes in temperature or pressure in the bed environment induce reduction of solubility of the encapsulating materials, resulting in their precipitation and accretion on the particle surfaces.

In both systems, reactive and non-reactive, the operation continues in the recycle mode until a satisfactory level of coating and/or curing is achieved. Then the system is shut down through a procedure that avoids further precipitation and/or polymerization of the polymer.

EXAMPLE

The process was demonstrated using energetic solid particles suspended in a fluidized bed with a recirculating supercritical fluid acting as both the fluidizing medium and as the solvent for a polymeric coating material. The energetic material, tailor-coated with a thin polymeric film, possesses unique controlled reaction characteristics, improved chemical and environmental stability, improved particle flow characteristics, and controlled burn rates. All operations are carried out in enclosed equipment and recover unused reactants, thus providing for an environmentally friendly process.

The example system uses carbon dioxide as the supercritical solvent, hydroxyterminated polybutadiene (HTPB) prepolymer resin, methylene diisocyanate (MDI) as the curative, and tributyl tin dilaurate as the catalyst. The particles coated are either ammonium nitrate (AN) or salt (NaCl) with a particle sizes ranging between 30–500 microns. The polymer system is solubilized at supercritical pressures (e.g. 1,100–2,000 psi) and at a temperature ranging between 32–50 Celsius. The precipitation and curing temperatures in the fluidized bed ranged between 60–120 Celsius. The resulting film thickness achieved was as low as 0.5 micron.

What is claimed is:

1. A method for forming thin films on undissolved particles, comprising the steps of:
    suspending undissolved particles to be coated in a supercritical fluid containing dissolved coating material thereon; and
    simultaneously nucleating and depositing the dissolved coating material onto the surface of the particles forming the desired thin films, whereby deposition, film making, and nucleation are initiated by changing a fluidized bed temperature.

2. A method as set forth in claim 1 wherein said suspending step is further defined as suspending particles to be coated in a recirculating supercritical fluid.

3. A method as set forth in claim 1, wherein said suspending step is further defined as forming a supercritical fluid solvent solution containing a pre-polymer, monomer or resin, additives, initiators, tacking agents, diluents, and inhibitors in amounts sufficient to achieve the desired thin film.

4. A method as set forth in claim 3, wherein said nucleating and depositing step is further defined as simultaneously depositing the coating and additives onto the surface of the particles forming desired thin films and forming thin films on the particles, and further polymerizing the coating on the particle surface.

5. A method as set forth in claim 3, wherein the polymer or prepolymer precursor coating is selected from the group consisting of a polystyrene, polyolefin, polyepoxide, polyester, polyurethane, cellulosic, polyacrylate, a condensation polymer, halogen, and any thermosetting polymer.

6. The method according to claim 4 wherein the monomer coating is any of the class of styrene, acrylic, vinyl, and halogen.

7. The method according to claim 1 wherein the supercritical solvent is carbon dioxide, water, nitrous oxide, propane, mixtures thereof, and mixtures of supercritical and non-supercritical solvents.

8. The method according to claim 1 wherein the particles coated are selected from the group consisting of ammonium nitrate, ammonium percholate, ammonium dinitramide, oxidizers, high energy fuel solid particles selected from the group consisting of carbohydrazide, metal azides, polymers highly substituted with strong reducing groups selected from the group consisting of amides and azides, low molecular weight organic fuels and pharmaceutical drugs.

9. The method according to claim 3, wherein the additives are any curative selected from the group consisting of primary amines, diisocyanates, any plasticizer including dioctyl phthalate, and catalysts selected from the group consisting of dibutyl tin dilaurate, secondary/tertiary amines, and free radical donors selected from the group consisting of ferric actyl acetonate and peroxides.

10. The method according to claim 1 wherein the depositing, nucleating and film forming steps are initiated by exposing the fluid to an ultraviolet light or any high energy radiation.

11. The method according to claim 1 wherein the uncoated particles that are coated by this procedure have a size range of between 10–1200 microns.

12. The method according to claim 1 wherein the thickness of the encapsulant coating the particle ranges from between 0.01 micron and 100 micron.

13. The method according to claim 1 wherein the supercritical fluid solution is recirculated continuously.

14. The method according to claim 1 wherein the particles are suspended by supercritical fluid flow in a fluidized bed, by free entrainment.

15. A thin film on particles by the process of claim 1.

16. The film according to claim 15, wherein said suspending step is further defined as suspending particles to be coated in a recirculating supercritical fluid.

17. The film according to claim 15, wherein said suspending step is further defined as forming a supercritical fluid solvent solution containing a pre-polymer, monomer or resin, additives, initiators, taking agents, diluents, and inhibitors in the amounts sufficient to achieve the desired thin film.

18. The film according to claim 15, wherein the polymer or polymer precursor coating is selected from the group consisting of a polystyrene, polyolefin, polyepoxide, polyester, polyurethane, cellulosic, polyacrylate, a condensation polymer, including halogen, and any thermosetting polymer.

* * * * *

UNITED STATES PATENT AND TRADEMARK OFFICE
Certificate

Patent No. 6,426,116 B1            Patented: July 30, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Aydin K. Sunol, Tampa, FL (US); John F. Jones, Tampa, FL (US); John P. Kosky, Clearwater, FL (US); Michael Murphy, Tampa, FL (US); and Eric Hansen, Tampa, FL (US).

Signed and Sealed this Third Day of April 2007.

TIMOTHY MEEKS
*Supervisory Patent Examiner*
Art Unit 1762